April 18, 1944. C. S. RAMSEY 2,346,787
ORE PROCESSING APPARATUS
Filed March 23, 1940 3 Sheets-Sheet 1
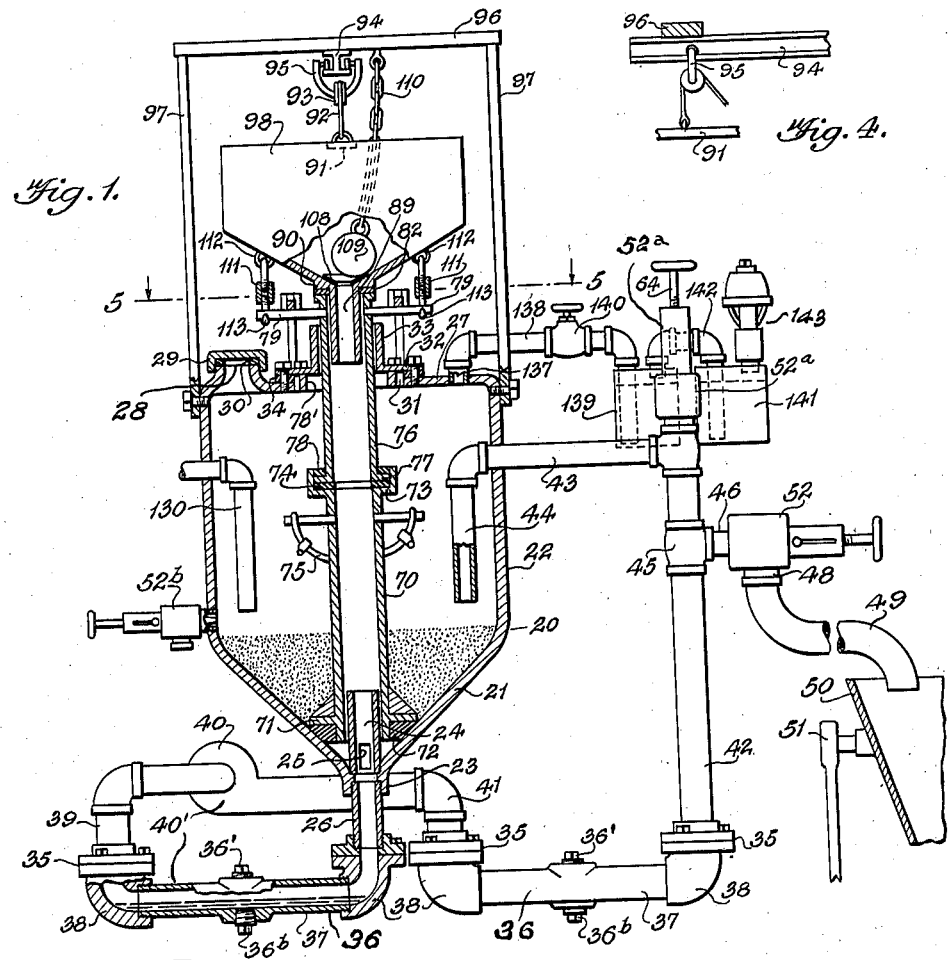
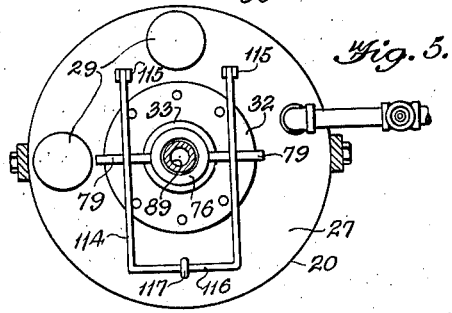
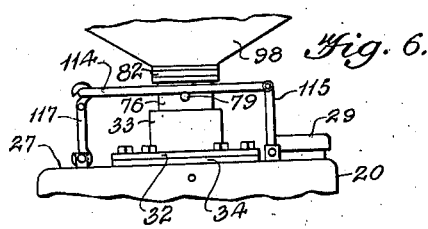
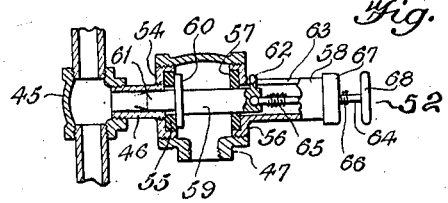
Inventor
Clarence S. Ramsey,
By Christian R. Nielsen
Attorney April 18, 1944.  C. S. RAMSEY  2,346,787

ORE PROCESSING APPARATUS

Filed March 23, 1940  3 Sheets-Sheet 3

Inventor
Clarence S. Ramsey,
By Christian R. Nielsen
Attorney

Patented Apr. 18, 1944

2,346,787

UNITED STATES PATENT OFFICE 2,346,787

ORE PROCESSING APPARATUS

Clarence S. Ramsey, Springfield, Ohio

Application March 23, 1940, Serial No. 325,647

7 Claims. (Cl. 23—272.6)

This is an improvement over my prior application Serial No. 136,281, filed April 12, 1937, and particularly with respect to claims 21, 44, and 45 allowed in said prior application.

The invention relates to means for extracting values from bodies of various kinds, and in its particular embodiment is adapted to use in ore processing.

It is an important aim of the invention to present an apparatus and method for extracting with increased efficiency values from complex ores wherein parts can only be satisfactorily extracted by leaching and other parts more economically recovered by amalgamation, and a related aim of the invention is to enable the leaching and amalgamation steps to be accomplished in one operation with high efficiency.

A still further object is to enable the construction of such apparatus which will be extremely simple and inexpensive.

It is an important desideratum to enable the use of ammoniacal or like leaching solutions with greater economy and efficiency than heretofore, and in this connection to present novel apparatus and method for the recovery and preservation of the ammonia, and for the more efficient solution of the metal salts or other elements with the use of a small amount of water. Particularly it is an object to enable the utilization of the active agent of the solution as a gas acting directly on the values to be recovered, as well as in solution, and with high economy.

A further important object of the invention is to present means whereby in the charging and operation of the system liability of obstruction of the apparatus by settled or compacted solids is obviated, and particularly, further, to enable the continuous high velocity circulation of the liquid medium and suspended material throughout the operation of the system, with a minimum of power, so that thorough suspension of the solids will be secured throughout, and whereby the establishment of suspension of fresh charges will be facilitated with a minimum requirement of power.

A further object is to present means for establshing simplified circulation of the slimes wherein gravity will not oppose the movement materially.

Other purposes are to present novel port and closure constructions for enabling the conduct of the essential operations of the system with efficiency and despatch.

Attainments of great value include the provision of means and methods whereby the tailings may be removed from the system with a minimum of labor or power, or expense, and with a minimum loss of water. These are of peculiar value because the ores requiring treatment with my apparatus are found in extremely isolated and arid regions, and the use of water is essential.

A further important accomplishment of the invention consists in enabling the constant maintenance of circulation of liquid in the system, first as a leaching solution, then as a slime when the solids to be extracted are introduced, and then, without intermission of operation, when the slimes are discharged, to begin the circulation of fresh solution ready for the introduction of a new charge of solids, with or without an intermediate change of the liquid medium in which the solids are suspended.

Additional objects, advantages and features of invention reside in the steps of procedure, and the construction arrangement and combination of parts involved in the embodiment of the apparatus system, as will appear or be understood from the following description and accompanying drawings, wherein Figure 1 is a vertical section of the slimes tank and circulatory system in an apparatus embodying features of the invention and enabling practice of the novel steps of process forming part of the invention with ammonia or other solvents shown at the charging of the tank, ready for introduction of the leaching and suspension solution.

Figure 4 is a view at right angles of a detail of Figures 1 to 3.

Figure 5 is a cross section on the line 5—5 of Figure 1.

Figure 6 is a fragmentary elevation of the junction of the hopper tank and slimes tank.

Figure 7 is a detail of the slimes discharge valve.

Main slimes tank

Figure 2:
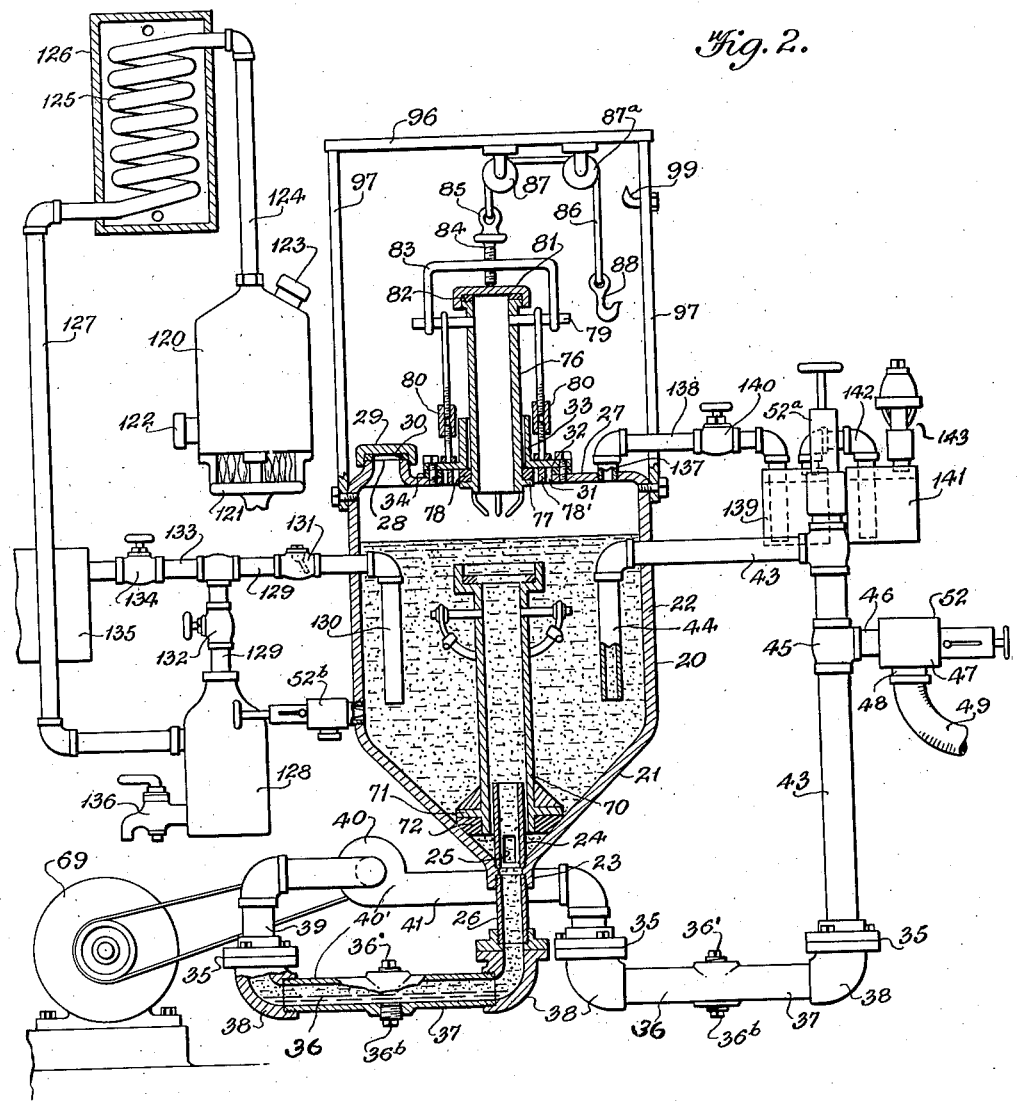
Figure 2 is a similar view showing a modification of the complete system for treatment of slimes requiring ammoniacal treatment, and at the time when the solids are completely suspended and the normal liquid level established, but parts having been removed.

There is illustrated a main slimes tank 20, of suitable metal, iron being good, or a steel of a moderate cobalt content, where ammoniacal leaching solution is employed. The tank may be mounted in any approved way, and is preferably circular in horizontal section, and formed with a conical bottom 21, either integral or attached to an upper cylindrical wall 22, the lower part of the bottom being formed with a slightly extended outlet port or mouth 23, which may be internally threaded, and in which there is secured an upstanding outlet port tube 24 having one or more lateral ports 25 therein through which comminuted ore in suspension may pass freely from the tank under the circulation hereinafter described. A depending outflow nipple 26 is also set in the outer part of the mouth, forming a conduit continuation from the tube 24.

The tank 20 has a top head 27, which may be either integrally formed on the tank or united therewith or secured thereto, as desired, and near the wall 22 one or more charging ports are formed in the head, each having a raised lip and closed by a screw cap 29, or other closure, a gasket seal 30 being interposed. The head is also formed with a large central manhole or other large opening 31 closed normally by a cover plate 32 having an upstanding sleeve 33 concentric with the tank in the present instance.

It may be bolted removably to the head 27 conventionally, with an interposed gasket 34. Means are provided to close and seal the sleeve 33 as will be described.

Circulatory system and amalgam pools

A circulatory system is established, including the tank and a conduit 40' beginning with the outlet nipple and reentering the tank at a higher level. This comprises a first mercury trap basin, or pool element 36, which is a substantially U-shaped tube as viewed from one side, but being formed with a bottom section 37 which may be a longitudinally rectilinear tube semicircular in cross section with the arched wall upward, having loading and unloading doors 36' and 36b at top and bottom, respectively, and having upturned L fittings 38 at the ends, each being part of a conventional union 35. The first L is connected with the lower end of the nipple 26, while the other L is connected to a nipple 39 from which a conventional connection is made with the intake of a centrifugal pump 40, which in the present instance is at a level above the basin 36, and its discharge pipe 41 is extended and connected to the upwardly extending arm of an L 38 of a second pool or basin element 36, similar to the first and forming with the first basin and the pump a continuation of the conduit 40' from the mouth of the slimes tank 20. The departure end of the second basin has connected thereto by its union 35 a riser 42, which extends upward to a level with an upper part of the tank 20, where an ajutage 43 is continued horizontally therefrom through the wall 22 of the tank and provided with a downwardly inclined nozzle pipe 44 which may be at a tangent to some arc concentric with the tank.

Tailings discharge

At an intermediate level, the pipe 42 is provided with a T 45, in which a lateral short nipple 46 is engaged, and connected to this there is a valve 52, including a case 47 having a downwardly directed discharge port 48 from which a flexible hose 49 is extended to a suitable hopper 50 or other receiver of tailings, cradler on trunnions as at 51, in the present instance, adapted to enable separation of pregnant solution or water from the tailings, and having a conventional means 52' for effecting tilting of the hopper and dumping of the residue, this means here consisting of an extension of one trunnion and gearing operatively associated therewith to be driven from any convenient source of power.

Slimes valve

The valve 52 in the present instance is shown as made up with the T body constituting the case 47, and being of considerably greater diameter than the nipple 46. It is provided with a bushing 54 into which the nipple 46 is screwed, and formed on the inner side with a rabbet seat in which there is secured a ring seat face 55 of rubber or other suitable material. A similar bushing 56 is engaged in the opposite end of the T fitted with a seat 57 similar to the one 55 and in this there is engaged a tube 58 of somewhat larger diameter than the nipple 46 and of suitable length for the uses to be described. In this tube there is slidable a valve stem 59, on which there is fixed a planiform valve 60 reciprocable between the seats 55 and 57 for alternative seating on the two. There is also formed a clearing stem 61 projecting from the opposite side of the valve 60 through the nipple 46 (when the valve is closed) to the path of stock which passes through the riser 42. This stem 61 may be tapered at its extremity, although this is not essential. But it is important to note that the stem 61 is shorter than the distance between the valve 60 and the seat 55 when the valve is opened and positioned against the seat 57, so that a good clearance is provided between the stem 61 and the end of the nipple in the case 47 and allowing a clear path to the discharge port of the case 47. In the outer end of the stem 59 there is set removably a lateral pin 62 engaged slidably in a longitudinal slot 63 by which the valve is prevented from rotating, and swivelled in the extremity of the stem 59 there is a screw bar 64 having threads 65 at its inner part and threads 66 at its outer part but having threads omitted on the intermediate portion which is also reduced in diameter. A cap 67 is fixed on the end of the tube 58, in which the unthreaded part of the bar 64 may slide freely, but interiorly threaded so that either threaded portion of the bar 64 may be screwed therein to hold the valve 60 at respective limits of its movement. A hand wheel 68 is fixed on the extremity of the bar 64 for its proper manipulation. It will be understood that the valve may be held in closed position by rotating the bar so as to screw the outer threaded portion of the bar 64 into the cap 67, and may be opened by reverse rotation unscrewing the bar a short distance, and then pulling the bar slidably through the cap until the inner threads of the bar engage the cap 67, when by a further reverse rotation of the bar 64 it may be screwed outwardly into the cap so as to hold the valve open.

At the junction of the riser 42 and the ajutage pipe 43 a similar valve 52—a is provided, the ajutage pipe leading from the discharge port thereof. The clearing stem 61 may be omitted in this valve if desired. In the first valve the stem 61 prevents accumulation of packed ore in the nipple 46 when the valve is closed, but in the second valve gravity will prevent such packing.

*Size of elements*

The pump 40 may be operated in any usual way, and in practice in an installation where fifteen to eighteen tons of ore are treated in a batch, a five-horse-power electric motor 69 is belted to the pump in a conventional manner, as indicated in Figure 2. For such an installation the tank would be approximately eight feet in diameter, and fourteen feet high, normally holding about 70,000 pounds of material, half of which is ore by weight. The conduit parts 24, 26, 43 and 44 should be eight inch cast iron pipe or other piping of corresponding size, in the installation indicated. The pool or basin elements 36 should be of cross section such that the clearance over the mercury will be not less than that of the supply pipe thereto, but the diameter of the effluent connections of the pools including riser 40 may be such as to reduce the velocity of the slimes leaving the mercury pools. The pump employed has been a centrifugal type available on the open market, of a size approximate to the size pipe used in the conduit, and with an impeller of appropriate strength and wear-resisting quality.

An auxiliary drain valve 52—b similar to valve 52, is provided on the side of the tank intermediately of the height of the ajutage pipe 43, to aid in removal of slimes or pregnant suspension medium, or as an alternative to use of the valve 52. The discharge from this valve may be utilized according to the nature thereof.

*Stand pipe valve*

In the tank there is set a stand pipe 70 of sufficiently larger diameter than the port tube 24 to slip freely downward therearound. There may be a clearance between the two. The pipe 70 is formed with a planiform foot flange 71 or seat, to the lower side of which a soft rubber or like seat facing 72 is permanently fixed, arranged to engage the conical part of the tank around the tube 24 as a valve, and the entire pipe 70 may be regarded as a valve, as indicated in my prior application. The tube 24 extends sufficiently within the pipe 70 above the port 25 to serve as a guide for the pipe 70 when the latter is raised to open the port, as will be described, and to hold the pipe in vertical position. The upper end of the pipe 70 is belled to afford an interior seat 73, which is also faced with rubber 74 or the like, and the lip of the bell is disposed at a level with or above the ajutage pipe 43 when the pipe 70 is in seated position on the bottom of the tank. The bell is smaller than the manhole 31, and for hoisting the standpipe from the tank, a bail 75 is pivoted thereon, of suitable size and proportions, also adapted to pass through the manhole.

*Liquid loading means*

Slidable in the sleeve 33 there is a port tube or filling tube 76, the lower end of which is formed with a planiform seat flange 77, adapted to engage the seat 74 snugly and the upper side of which has secured thereon a similar seat facing 78 adapted to engage the underside of the cover plate 32 when the flushing tube is raised. A confining collar 78' on member 32 may be provided around the facing, if desired. Lateral rigid arms or lugs 79 are provided fixedly on the tube 76, means being also provided to engage these and press the tube either upwardly to seat at the cover plate, or downwardly to seat in the bell of the standpipe 70. In the present instance, the means to hold the tube 76 upward may comprise turnbuckles 80, adapted to be extended under compression between the lugs 79 and the cover plate as an alternative to a hoist device to be described. The upper end of the tube 76 may be closed with a cap 81 and to make such closure gas and liquid tight, a soft rubber facing 82 is applied to the top of the tube, which may be flanged to afford an adequate face on which the facing may be applied. The cap is held in place by means of a bail 83 on the arms 79 and having a screw 84 engaged therethrough, so that when the bail is raised over the cap the screw 84 may be screwed against the cap to hold it in sealed position. The screw is formed with an eye 85, and by means of a hoisting cable 86, pulleys 87, and anchor hooks 88, the bail may be used as a hoist to lift the tube to sealing position instead of the turnbuckles, or to remove the tube and plate 34.

A hopper tank 98, open at the top and formed with a discharge spout 89, is set upon the upper end of the tube 76, with the spout entered in this tube. It has a seat 90 at its lower side to engage the facing 82. The hopper is provided with a cross bar 91 at the top with which there is separately engaged a hoist cable 92 carried over a pulley 93 suspended from an I-beam 94, which may be part of a crane or otherwise movable if desired, the detail of its mounting not being shown. The pulley 93 is mounted on a carriage 95, which is adapted to travel along the beam 94.

*Hoists*

In the present instance, the pulleys 87 are mounted on the under side of a cross beam 96 supported at the upper ends of uprights 97 fixed on opposite sides of the tank 20, or otherwise erected. A longer cable 86' may be mounted alternatively in these pulleys to hoist the stand pipe 70 as required. This cable is extended from the outermost pulley 87 to an anchorage 99 on one of the uprights 97 and a weight 100 may be suspended thereon, the mass of which is slightly greater than the unbalanced mass of the standpipe 70 when the latter is submerged in the fully homogeneous mixture of the ore aggregates and solvent liquids in the tank. The stand pipe will remain seated while the tank 20 is filled with liquid, while the ore charge is introduced, and while the latter is in a settled state or partly settled and being moved into suspension, but when the ore charge is all fully suspended, the weight 100 will overbalance the standpipe, and draw the cable 86' over the pulleys, lifting the standpipe. In the size of equipment indicated, the stand-pipe should be lifted about twelve inches, more or less. As it is lifted from the slimes, it is sustained less and less by the displaced slimes, and it comes to rest when the weight and partly submerged standpipe are balanced.

*The hopper tank*

The hopper tank is formed with a suitably faced port 108 at the throat of the hopper, the throat being the inner end of the spout 89, and a ball valve 109 is provided adapted to seat in the port. The facing at 108 may be resilient rubber or other suitable material. The ball valve 109 may be equipped with any usual guide means to cause it to move to a proper seat in the port when raised and released. A cable, wire, or other lifting means 110 may be attached to the ball and anchored either to the carriage 95 or cross beam 96, the cable being of such length that when the tank 98 is in lowered position, resting on the filler tube 76, and the latter set on the seated stand pipe, as in Figure 1, the ball will be held from its seat so as to permit any liquid content of the tank 98 to flow into the tank 20 through the filler tube and into the standpipe 70. When the tank 98 is raised from its last named position and relation to the tank 20 with the tube 76 attached thereto or not, the ball will move to its seat, and by introducing a proper quantity of liquid solvent or the like into the tank 98, the ball will be held to its seat with sufficient force to withstand pressures in the tank 20, the special utility of which will subsequently appear.

Means is provided to connect the hopper tank and filler tube tightly together, but releasably, consisting in turn-buckles 111, one element of each of which is swivelled as at 112 on the under side of the tank 98, and the other element of which is releasably connected as at 113 with a respective lug 79 on the tube 76. In case it is considered necessary to hold the tube 76 downwardly with greater force on the stand pipe 70, as when the cap 81 is required, the means shown in Figures 1, 5, and 6 may be employed. This consists of a yoke 114, U-shaped in plan, pivoted at the ends of its arms on links 115 pivoted on the head 27 of the tank, the links 115 being of such length and position that the yoke may be swung inwardly around the tube 76 to rest with the arms of the yoke across the lugs 79 and in nearly or quite horizontal position. The bight portion 116 of the yoke is secured by a suitable tie or hold-down hook member 117 on the head, so that the yoke is pressed upon or held closely over the lugs 79.

Solvent rejuvenation means

At a convenient point a generator device 120 is located which may consist of a still tank of conventional construction, and a burner 121 or other heating means, a bottom clean-out door 122 and suitable hermetic closure being provided as well as charging neck 123 with appropriate closure, also gas-tight. From the top of the still a pipe 124 extends to the upper end of a condenser coil 125, set in a suitable heat exchange device 126, or other conventional means for exchanging or dissipating heat. From the lower end of the coil a pipe 127 leads downward to and is connected into an intermediate level of a receiver 128. This vessel is provided with a draw-off or drain cock 136 or other means for removing liquid content of the vessel. From the extreme upper part of the vessel 128, a gas conduit pipe 129 is extended through the side of the tank 20, at any desired level although shown at the same level as the ajutage pipe 43. The gas conduit has a downwardly directed discharge or nozzle section 130 arranged to deliver gas into the tank 20 at a low level. It is shown opening at a level which would be above the top surface of a settled charge of ore aggregates, although this is not arbitrary. A check valve 131 is provided in the pipe to prevent movement of gas or liquid from the tank 20 toward the still, and a hand or other feed valve 132 is put in the pipe 129 close to the top of the receiver. Immediately beyond this valve and outwardly of the check valve, away from the tank 20, a compressed air supply line 133 is connected into the pipe 129, with a suitable air supply control valve 134. This air supply line may lead from any suitable source of compressed air, formally shown at 135.

From the drain cock 136 liquid may be conducted in any conventional manner to storage or to the tank 20 as desired.

In the head of the tank 20 a vent nipple 137 is set, from which a gas vent pipe 138 is extended into the bottom of an absorber tank 139, conforming to approved practices in such devices. A vent valve 140 hand operated is provided in this pipe 138 from the tank 20, and an auxiliary absorber tank 141 may be provided if desired, into the bottom of which gas not absorbed in the tank 139 is discharged by a second vent pipe 142 from the top of the tank 139. At the top of the auxiliary tank, a conventional adjustable pressure retaining blow-off valve 143 is provided adapted to vent gases not absorbed in the remainder of the system, when a given pressure is exceeded in the system.

The separation of slimes and solvents is well understood, and any approved means may be associated with the means for discharging or otherwise removing the slimes from the tank 20, to separate the ore residue from the final liquid content, the latter being returned to the tank 20 as required, with or without intervening distillation at 120, according to the nature of the liquid.

Operation of the system

In the operation of this system and apparatus modifications may be made appropriate to the treatments found peculiarly advantageous for different ores, as will be understood by those versed in the art, from the foregoing description of apparatus.

In the treatment of malachite and azurite ores, and in fact for most of the copper salts found above the sulphide zone, my apparatus and method are found peculiarly valuable and especially where copper salts are found with some gold or silver, or both. It is adapted to the simultaneous leaching of copper salts and amalgamation of gold and silver; or for the recovery of values by successive steps with different solvents, without removing the ore from the apparatus, such as leaching with dilute sulphuric acid, washing, alkalizing, and then cyaniding for gold and silver or other values.

The invention is not limited to the treatment of ores, but could be used for the extraction of values from various solids. For instance; extracting the active principles from crude drugs, replacing the old method of percolation by which tinctures and fluid extracts are made in an alcoholic vehicle.

For the treatment of compound ores requiring ammoniacal leaching and also having gold and/or silver available for amalgamation, the procedure is as follows, after the apparatus has been erected substantially as described.

The tank is placed in proper condition by closing all valves in the system except the valve 52a and the gas vent valve 140, adjusting the standpipe 70 in position upon the conical bottom of the tank, the filling tube 76 being set in the bell of the standpipe and after the yoke 114 has been secured down on the lugs 79 by the holddown 117, the hopper tank 98, filled with a charge of water or liquor before or after, may be introduced in position with its spout extended into the upper end of the tube 76, and the seat 90 engaging the upper end of the tube. By reason of the cable 110 unseating the ball valve 109, any liquid in the tank will then be immediately discharged through the tube 76 and standpipe 70 into the circulatory system, without entering the tank 20 directly. If desired, the tank 98 may be suspended slightly above its seat on the tube 76, the valve 109 being thus retained seated, until the operator makes a final check before discharging the solvent from the tank 98. At any time then that the tank is lowered the valve will open and the contents be discharged.

The ore is comminuted by the usual stamping methods, and machinery, and the fines introduced into the empty tank 20 in charges of suitable size by the use approved apparatus or by hand. For the economy of ammonia, the ore charge may be first introduced through one or more of the charging ports 28. Mercury is also introduced into the basins 36 before the leaching liquid is introduced by opening the loading doors 36—A and pouring in the proper quantity of mercury, then securing the doors in closed position.

The initial charge of liquid in the tank 20 may be water or a solution of ammonia. In order to minimize waste of ammonia, anhydrous ammonia in proper quantity may be introduced additionally, from the still 120 or other source, during the circulation of the slimes, as will appear. The suspension liquid is now introduced in a quantity sufficient, with the ore charge, to establish a liquid level in the tank 20, at least above the ajutage pipe 43. It is an advantage of this that there will be a hydrostatic balance of the two legs of the circuit of slimes, one in the tank and one in the conduit 40' beside the tank, so that no expenditure of power will be required in merely lifting the slimes from one level to another. The pump 40 is placed in operation after the liquid is introduced, and the tube 76 must be raised from the standpipe 70 when the pump operates (the yoke 114 being disconnected from the hold-down 117 so that the yoke may be lifted by the lug or the tube may be rotated so that the lug will clear the yoke). The tube 76 is raised from the bell of the standpipe 70, until the flange 77 is pressed against the seat facing 78, effecting a sealing of the tank there. This raising may be effected by hoisting of the tank 98 which may be retained connected to the tube 76 throughout the leaching, when ammonia and other solvents of a volatile nature are used.

The pump 40 being now in operation, it establishes a very rapid flow of the liquid through the conduit 40'. As the liquid leaves the nozzle pipe 44 it is directed downwardly against the charge of comminuted ore. This rapidly lifts the ore particles in the rapidly moving current, the liquid and suspended matter falling into the pipe 70 and passing to the pump again. The entire body of ore is quickly thus brought into suspension, each orbital movement of the suspension liquid placing a larger part of the ore in suspension until the whole constitutes a homogeneous fluid or slimes moving at high velocity through the conduit 40'.

When the tank 98 and tube 76 are raised, the ball valve 100 becomes seated, as well as a seal around the tube 76 effected by the seat flange 77. By introducing a body of liquid into the tank 98 ready for the next use of liquid therefrom, the valve 109 is then pressed to its seat and a liquid seal effected in addition. The turn buckles 80 may be used additionally, and if desired, the tank 98 may be removed and the tube 76 closed with the cap 81. If the liquid first introduced through the tank 98 is an ammonia solution, a rapid leaching of the ore will be effected, and the action will be enhanced by placing in the still a charge of pregnant liquor from the previous leaching operation, and distilling the ammonia therefrom, opening the valve 132 so that the anhydrous ammonia ($NH_3$) first given off in the distillation of ammonium hydroxide ($NH_4OH$) or the excess conjointly thrown off with water and collection of the latter in the receiver 128, in the distillation of cupric ammonium hydroxide and similar compounds will act directly on the copper values in the ore with which it comes in contact when released in the tank. The remainder of the ammonia so discharged and not immediately reacting with the copper elements will be rapidly absorbed by the water of the suspension liquids and the ammonia thereby circulated with and distributed throughout the slimes to act further as such or as hydroxide on other copper salts thereby conducted. The still is preferably not operated to complete expulsion of water from the copper ammoniate.

The circulation of the slimes with the conduit elements in the last named relation is maintained in conjunction with the continued introduction of ammonia from the still until complete leaching of the copper content or a satisfactory impregnation of the leaching liquid with copper values is effected, or until the body of liquid and copper compound from which the ammonia is distilled is reduced to a predetermined low content of ammonia, or circulation may be continued further if further movement of the slimes on the mercury pools is desired to effect amalgamation of gold or other values still available for amalgamation.

If it is desired to treat the fines with a fresh leach-liquor, a proper quantity of water or ammonia being ready in the tank 98, or ready to be discharged therethrough, the latter tank and the sleeve 75 as a unit are lowered to the top of the standpipe 70 and the liquid immediately discharged directly to the conduit 40', washing the latter free of slimes, and the pump 40 stopped as soon as the conduit has been cleared of slimes by the flushing liquid. The latter will then stand as a supernatant liquid in the tank 20, and the ore will settle to the bottom of the tank below the level of the valve 52b, with the pregnant liquor between the ore and supernatant flushing liquid.

The pregnant liquor may now be drawn off through the valve 52b and removed to storage or to the generator 120 for distillation. As soon as all the strong liquor is drawn off, the valve 52b is closed, leaving still an amount of the flushing liquid in the tank 20, and if necessary, more may be introduced to raise the level above the ajutage 43. The tank 98 and tube 76 are then again raised to seal the tank 20, and the pump 40 placed again in operation. The ore becomes quickly suspended again, circulating the fresh liquid and forming slimes as in the first instance. If there was sufficient ammonia in the flushing liquid, a further leaching will occur thereby, but by continued operation of the generator 120 the necessary reaction can be restored or augmented so as to effect the further leaching desired.

If the ore is of a compound nature requiring leaching with a new and different solvent, in the flushing and shut down of the pump as last mentioned, water is used as the flushing liquid and after removal of the pregnant liquor, the operation of the pump is restored for a time to wash the ore with the flushing water, and any added water that may be considered necessary. This brings the ore into suspension again, and after a sufficient movement of the slimes thus formed, a further flushing with water from the tank 98 as last described to clear the conduit 40' is effected, and the pump again shut down, allowing the ore to settle while the conduit 40' is full of water only. This washing water constituting a weak solution of the cupric ammonium hydroxide is then drawn off through valve 52b, and the latter closed. If an alkalizing treatment is required this may be effected by introducing the proper alkaline liquid, or by charging the tank with the necessary salt through the port 28 accompanied by the introduction of water and renewed operation of the pump with the tube 76 lifted.

Figure 3:
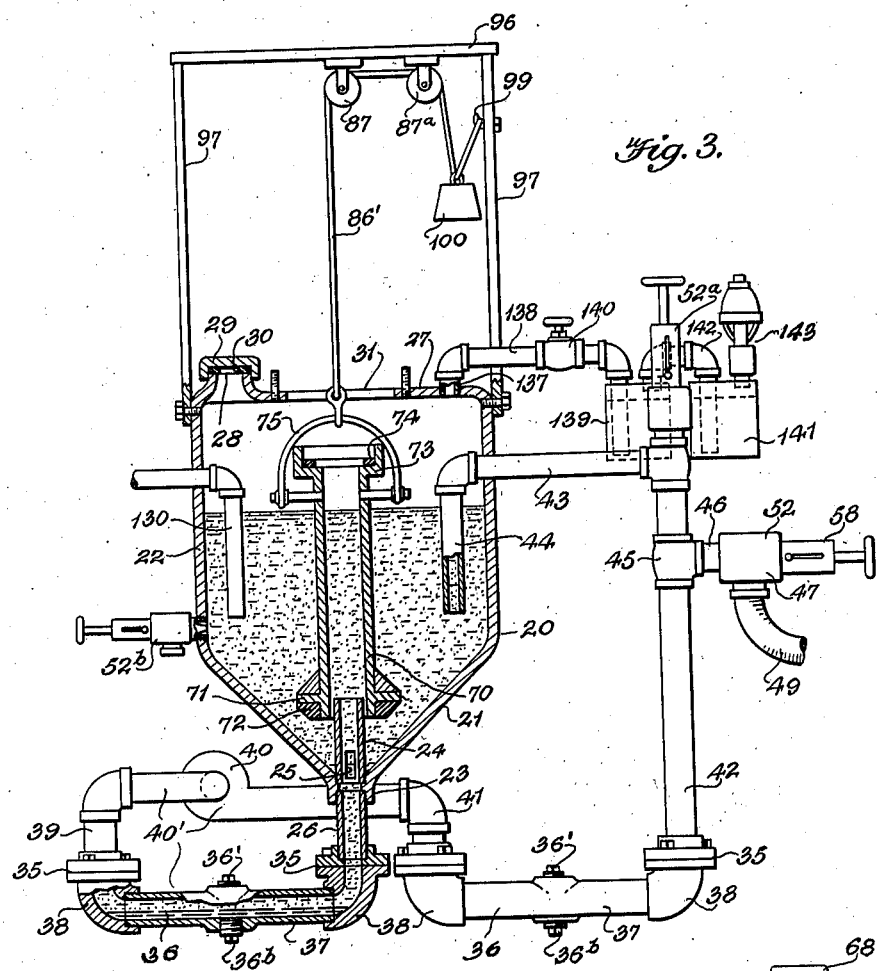
Figure 3 is a similar view showing a further modification of the system as operated with an open tank, and at a stage where it is ready for discharge of the tailings after one method of operation.
Figure 9:
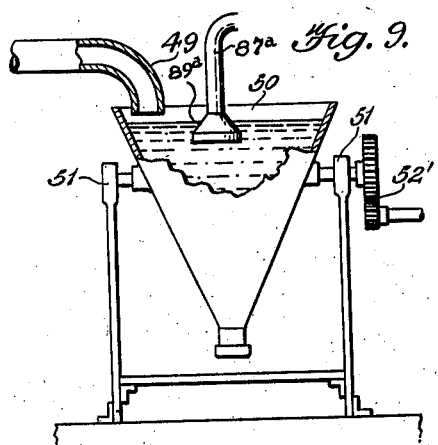
Figure 9 is a detail of the settling hopper for tailings.
Figure 8:
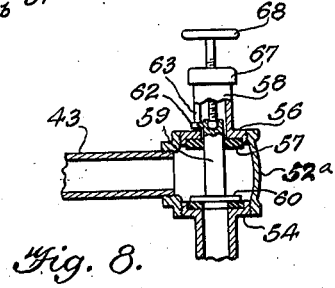
Figure 8 is a detail of the slimes return cut-off valve.

In some treatments where no volatile elements are present the tube 76 and cover plate 32 may be completely removed as in Figure 3, leaving the manhole 31 open for such operations as accompany the introduction of the alkalizing material. After the alkalizing the new solvent may be prepared or introduced in accordance with the procedure already described, and the circulation of the new slimes effected by the pump 40 as long as required.

When all practical values have been removed from the ore, and the final solvent has been removed as before described, a tailing water is introduced and the pump operated to establish a circulation by which the ore residue is placed in suspension finally, for removal.

Whenever the ore residue is to be removed, the tank is opened, as in Figure 3, and the cable 86' and weight 100 connected as shown in Figure 3, while the ore residue is settled. Initially the stand pipe 70 will remain in lowered position. Then, as soon as the entire body of ore residue has been brought into suspension the liquid and the ore residue will constitute a homogeneous tailings fluid, such that after the foot of the pipe 70 will have been cleared of settled ore, the pipe may be easily raised, and the weight 100 will automatically raise the pipe 70 from the bottom of the tank and so hold it during the remainder of the circulation of the tailings of this charge. The fluid now passes directly through the outlet port 25 to the conduit 40' the current from the nozzle 44 serving to produce sufficient currents in the body of slimes in the tank to effect a uniform suspension and maintain the suspension liquid and ore matter as a homogeneous fluid.

The last named circulation may be utilized at other stages of the treatments, if desired. While the pipe 70 is thus raised, whenever the tank 98 and filling tube are positioned in engagement with the pipe 70 as before described, and lowered, the pipe 70 will be forced to seated position again, with immediate release of whatever liquid there may be in the tank 98 to the conduit 40', thus instantly clearing the latter. Stoppage of the pump may at these times be effected with safety from liability of blocking or choking of passages by settled ore, and the circulation can always be immediately established or reestablished without delays in removing obstructions.

After introduction of the tailings water, and establishment of suspension of the ore residue therein, the pipe 70 is finally raised, the valve 52 opened, and the tailings conducted through the pipe 49 to the final settling tank 50, where removal of the water and its return to storage may be effected in familiar ways. If the tailings are to be delivered at a level or head greater than that at the valve 52, it would be desirable to close the valve 52a at the top of the riser 42 until the tailings have been discharged.

As soon as, or before, the last of the tailings have left the tank 20, a final washing water is introduced into the tank 20 to clear the last of the tailings past the pump and through the valve 52, after which the procedure previously described for initiating treatment of a charge may be repeated.

The mercury may of course be removed before any particular leaching operation, especially with a solution or solvent which would foul the mercury. In such event, after the washing of the ore and its settling after flushing the conduit 40', washing water would be drained at 52b, and the last of the water and the mercury removed at the unloading doors 36B.

It will be seen from the foregoing that many and varied treatments may be applied to ores without removal of the ore from the tank 20; each effected with great ease and economy, both in time, and expenditure of energy in any form; and with high efficiency in processing and economy of water and solvents.

*Operation of the generator 128*

For operations of the character indicated and in the situations ordinarily involved, it may be found most economical to transport the ammonia to the plant as liquefied anhydrous ammonia in commercial high pressure cylinders, and to release it into the slimes in the tank 20, as required, until a desired body of strong liquor is available. The water would be brought in separately and used as required to afford the proper suspension of the ore as treated. After leaching of ore sufficiently to form a pregnant liquor of a reasonable concentration of the ore values therein, the pregnant liquor is separated as indicated and introduced into the still 120, and the heater 121 operated and the valve 132 opened. It will be understood that with ammonia in solution in water in this product, with moderate concentration or as the simple hydroxide, initially the ammonia will be given off from such strong ammonia liquor in comparatively large volume at temperatures materially below the boiling point of water, and the condenser coil will serve as a rectifier for this gas (although this is not specially sought or material) removing the water which will drain to the receiver 128 re-absorbing on the way a part of the anhydrous ammonia and reforming a small amount of strong ammonia liquor in the receiver. The gaseous ammonia will produce a pressure which will force it readily into the tank 20 when the valve 132 is open. The ammonia of the cupric ammoniate in the still is less readily disassociated from the copper, and consequently after the simpler forms are exhausted much higher temperatures are involved in the further distillation which will be at or above the boiling point of water. The result is that much water goes over at the same time with the ammonia and is condensed in the coil 125 and cooled so that it reabsorbs much ammonia forming a strong liquor in the receiver 128. But there is still a considerable excess of ammonia which passes to the tank 20 as before indicated. The concentrated ammonia liquor from the receiver 128 may be introduced into the tank, at proper times by any suitable means.

Any gases evolved in the still not capable of absorption by the suspension liquid will escape through the blow-off valve.

The precipitated copper oxide and some copper ammoniate liquor remaining after a period of distillation, may be run off together from the still at intervals and the copper oxide recovered and otherwise treated in accordance with approved practices.

It will be apparent that with the apparatus described and the method practiced, a sealed treatment of large quantities of ore is made practicable with economy and high efficiency. By enabling the movement of the slimes residue from the tank, a considerable economy of labor and power, as well as of time is effected, and all treatments may be conducted with a minimum loss of volatile solvent by evaporation, as well as the repeated utilization of a comparatively small amount of water made practicable.

I claim:

1. In a leaching apparatus, a sealed tank having a conical bottom, means to establish therein a circulation of liquid including a conduit communicating at one end with tank at the apex of the conical bottom and at the other end with an upper portion of the tank, means to circulate liquid through the conduit, a stand pipe element movable vertically in the tank, and in its lowermost position communicating with the conduit at the bottom of the tank and having its upper end below the top of the tank, a vertically movable tube slidable through the top of the tank, constructed and arranged to engage with and form a sealed continuation of the stand pipe, a hopper tank constructed and arranged to deliver to said tube, means to lift said hopper and tube as a unit and means to form a sealed joint between the hopper and the tube when the two are engaged.

2. The structure of claim 1, in which a resilient seat facing is mounted on the lower end of the stand pipe and cooperable with the bottom of the tank, a sealing means between the stand pipe and said vertically movable tube, a sealing means between the vertically movable tube and the tank top, and means to alternatively press the movable tube upon the stand pipe and to raise the latter with said hopper and movable tube and press the vertically movable tube against the sealing means of the tank top.

3. In a system of the character described, a conical bottomed sealed tank, means to establish a circulation of liquid therein including a conduit having one end arranged to receive material from the vertex of the bottom of the tank and the other arranged to discharge into a higher part of the tank above the level of a charge and having a downwardly directed nozzle, means to move liquid through the conduit, a standpipe vertically movable axially in the tank and having an open top terminating below the top of the tank and above said nozzle a distance, a conduit section positioned above the standpipe and slidable through the top of the tank, compression seat means on said section and tank to form a seal when the extension is raised, a hopper tank operatively associated and movable with said conduit section adapted to discharge liquid into the latter, a valve for the hopper, means responsive to raising of the hopper to close the valve when the hopper is raised, and means to raise the conduit section and hopper as a unit, said means including clamping means for holding the conduit section and hopper together as a unit.

4. The structure of claim 3, in which the stand pipe, said conduit section and said hopper are separable units, means for forming compression joints therebetween, means to press the hopper downward, means to raise the hopper whereby the compression joint between said conduit section and tank top is broken.

5. In apparatus of the character described, a tank having a standpipe therein and means to circulate liquid orbitally in a circuit including a conduit, a pump, the tank and a standpipe in series whereby the liquid will overflow into the standpipe, said tank having a top portion, a tube slidable therethrough to form a connection with the top of the standpipe in lowered position, and slidable into spaced relation with the standpipe when in elevated position, means to seal the tube upon the standpipe when in lowered position, a seat on the tank around the tube, and a sealing element on the tube arranged to engage the seat when the tube is in elevated position to form a seal, and means to hold the tube at the last named position.

6. In ore processing means, a tank, a pump located adjacent the bottom of said tank, means of communication between the bottom of said tank and the inlet of said pump, a nozzle at the top of said tank, means of communication between the discharge of said pump and said nozzle, and a removable valve associated with said tank, said valve comprising a casing having sealing means at its lower end adapted to engage around an opening in the wall of the tank, said casing having an open upper end, and a sleeve vertically movable with respect to said casing adapted in its lower position to seal the open upper end of the casing, said casing when open providing a continuation of the means of communication between the bottom of the tank and the inlet of the pump.

7. In ore processing apparatus, a tank device, a circulatory system operatively associated therewith including a conduit having communication with the bottom of the tank adjacent one end of the conduit and with a higher part of the tank at the opposite end of the conduit, means included in the conduit to propel fluid material through the conduit, the upper end of the conduit having a terminal discharge element inside the tank and being directed downwardly, separable means adapted to form an extension of the first named end portion of the conduit to a level above the discharge element, said extension having a flange adjacent the lower end thereof upon which ore comes to rest, and means to automatically raise said extension consisting of a hoist means having a counterweight adapted to be detachably engaged with said extension.

CLARENCE S. RAMSEY.